United States Patent [19]

Inaba et al.

[11] 4,274,802
[45] Jun. 23, 1981

[54] AUTOMATED DEVICE

[75] Inventors: Hajimu Inaba, Hino; Shigemi Inagaki, Musashino, both of Japan

[73] Assignee: Fujitsu Fanuc Limited, Hino, Japan

[21] Appl. No.: 5,773

[22] Filed: Jan. 23, 1979

[30] Foreign Application Priority Data

Jan. 31, 1978 [JP] Japan .............................. 53/9661[U]

[51] Int. Cl.³ .......................... B25J 9/00; B25J 13/00; B25J 17/00
[52] U.S. Cl. ..................................... 414/783; 414/758; 414/591; 414/730
[58] Field of Search ............... 414/730, 732, 735, 719, 414/758, 783, 591; 92/13.5, 85 R

[56] References Cited
U.S. PATENT DOCUMENTS

| 3,160,077 | 12/1964 | Ribeiro | 92/13.5 |
| 3,231,255 | 1/1966 | Olson | 92/85 R X |
| 4,076,131 | 2/1978 | Nilsson | 414/730 |

FOREIGN PATENT DOCUMENTS 53-14828  5/1978  Japan ................................. 414/744 A Primary Examiner—Lawrence J. Oresky
Attorney, Agent, or Firm—Armstrong, Nikaido, Marmelstein & Kubovcik

[57] ABSTRACT

An automated device comprising an arm, a supporting case mounted on the end of the arm, a rotary actuator mounted on the end of the supporting case and a wrist with a hand rotatably held by the rotary actuator, wherein the rotary actuator has a replaceable stopper on the shaft thereof, and the supporting case has a pair of static members for setting the rotational range of the stopper. In the device, the rotary actuator stops rotating at two positions, i.e., the hand stops rotating at two positions.

7 Claims, 6 Drawing Figures

AUTOMATED DEVICE

The present invention relates generally to an automated machining system and, more particularly, to an automated device used in loading and unloading of workpieces, changing of tools, disposing of chips, etc., for a computer-aided numerically-controlled machine tool system.

A computer-aided numerically-controlled machine tool system (hereinafter referred to a CNC machine tool system) includes an automated device for loading and unloading of workpieces, changing of tools, disposing of chips, etc. Furthermore, the system includes CNC machines (Such as CNC lathes), tables for workpieces, racks for tools, etc., positioned on the periphery of the above-mentioned automated device. The automated device carries out loading and unloading of workpieces, carrying of workpieces and tools, disposing of chips, etc. The automated device basically has a hand provided with at least two fingers for gripping workpieces or tools; a wrist for holding the hand; a driving unit for rotating the wrist together with the hand, and; an arm on which the driving unit is mounted. The arm is capable of being extended and retracted. In some situations where a small number of regular operations are performed, it is very useful for the hand to be capable of ceasing rotation at only two or three positions, such as 0, 90 and 180 degrees.

In an automated device of the prior art, a driving unit for rotating a hand is composed of: one or two cylinders having pistons therein, and; a gear connected to the hand which is rotated by the lateral movement of the pistons. This lateral movement is carried out by inserting and ejecting fluid into and out of the cylinders. Therefore, if fluid is inserted or ejected into or out of one of the cylinders and the piston thereof reaches a terminal point of the cylinder, the gear stops rotating and, consequently, the hand stops rotating. Thus, the hand stops rotating at two positions which are not adjustable. As a result of the automated device being provided with the cylinders, the gear, etc., the automated device is of a complex mechanical construction which is high in cost. In addition, it is difficult to change the stop positions of the hand, because the positions of the cylinders for defining the stop positions are non-movable.

It is the principal object of the present invention to provide an automated device used for a CNC machine tool system comprising a rotary actuator for rotating a hand and a replaceable stopper for stopping the rotation of the rotary actuator which requires no cylinders, gears, etc. This automated device is simple in construction and low in cost. Also, it is easy to change the stop positions of the hand in this automated device.

The present invention will be more apparent from the ensuing description with reference to the accompanying drawings wherein.

Figure 1:
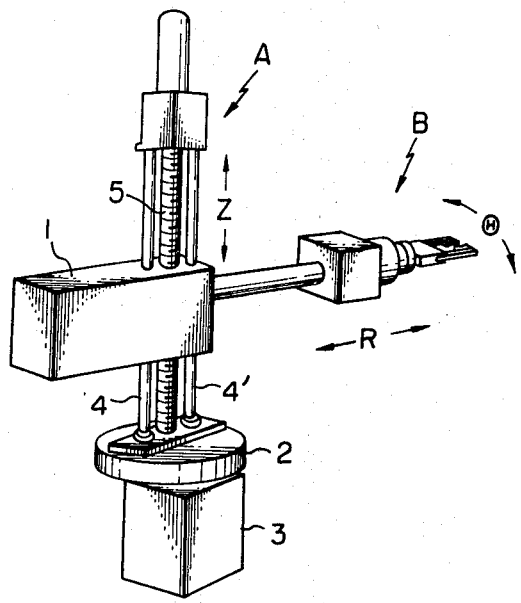
FIG. 1 is a perspective view of an automated device according to the present invention.

Referring to FIG. 1, an automated device of the present invention is composed of a main body A and a gripping part B. The gripping part B is movable in three directions (see arrows R, Ⓗ and Z). The gripping part B is moved back and forth along the directions of the arrows R by a motor contained in a driving unit 1. The gripping part B together with a turning table 2 is moved to the right and the left along the directions of the arrows Ⓗ by a motor contained in a driving unit 3. Furthermore, the gripping part B is moved up and down along the directions of the arrows Z by another motor contained in the driving unit 1, with the help of two shafts 4, 4' and a lead screw 5. Thus, the gripping part B can be moved in three directions with respect to the main body A. The elements composing the gripping part B will now be explained.

Figure 2:
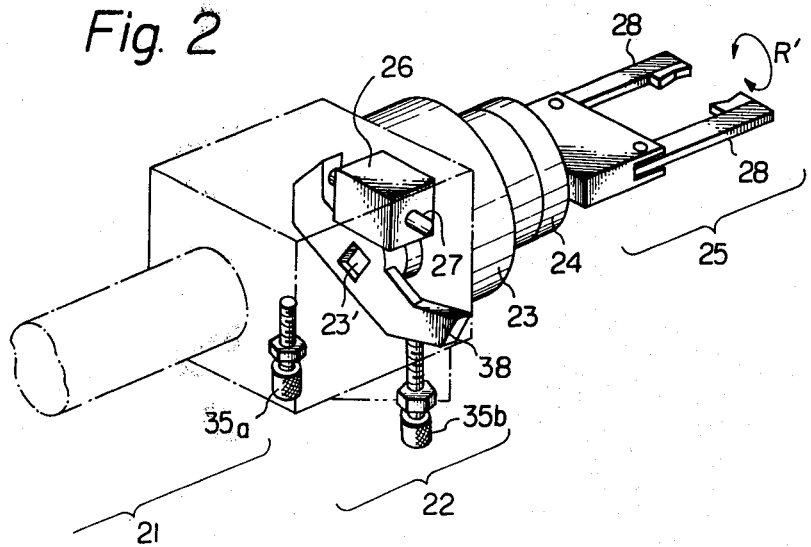
FIG. 2 is a detailed perspective view of the gripping part B of the automated device illustrated in FIG. 1.

FIG. 2 is a detailed perspective view of the gripping part B of the automated device illustrated in FIG. 1. As indicated in FIG. 2, the gripping part B is composed of an arm 21, a supporting case 22 mounted on the end of the arm 21, and a rotary actuator 23 fixed to the supporting case 22. The rotary actuator 23 is of a well-known type which is driven by air pressure or liquid pressure. On the shaft 23' of the rotary actuator 23 are mounted a stopper 38 and a wrist 24 with a hand 25. Accordingly, when the shaft 23' of the rotary actuator 23 rotates, the hand 25 and the stopper 38 also rotate (see arrow R'). As a result, when the shaft 23' is rotated, the stopper 38 comes into contact with a pin 27 of a cushion 26, wherein the pin 27 is connected to a disk contained within the fluid of the cushion 26. After that, the stopper 38 abuts against one of bolts 35a and 35b. This cushion 26 is useful for slowing down the velocity of rotation of the shaft 23'.

Figure 3A:
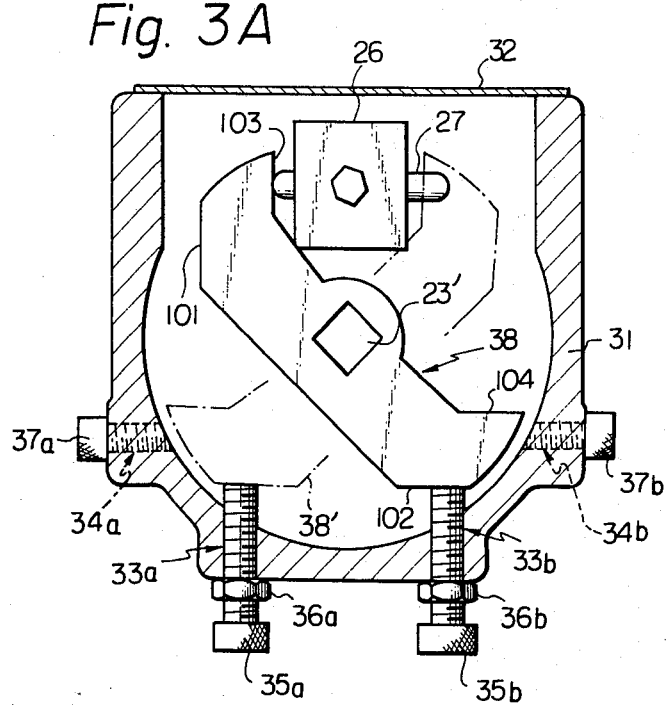
FIG. 3A is a detailed cross-sectional view of the supporting case 22, illustrated in FIG. 2, used for setting the rotational range of the hand at 90 degrees.

FIG. 3A is a detailed cross-sectional view of the supporting case 22, illustrated in FIG. 2, used for setting the rotational range of the hand at 90 degrees. In FIG. 3A, the supporting case 22 has a pair of threaded holes 33a and 33b and another pair of threaded holes 34a and 34b. The supporting case 22 is provided with a pair of bolts 35a and 35b in the threaded holes 33a and 33b, respectively, and nuts 36a and 36b for the bolts 35a and 35b, respectively, for defining the stop positions of the stopper 38. The supporting case 22 is also provided with a pair of bolts 37a and 37b for blocking the threaded holes 34a and 34b, respectively. The stopper 38 has four surface 101, 102, 103 and 104, wherein the surfaces 101 and 102 are used for abutting against the bolts 35a and 35b, respectively, and the surfaces 103 and 104 are used for abutting against the pin 27 of the cushion 26. The surfaces 101 and 103 are parallel to each other and perpendicular to the surfaces 102 and 104, which are parallel to each other. The stopper 38 operates as follows. When the shaft 23' of the rotary actuator 23 (FIG. 2) is rotated in the clockwise direction in FIG. 3A, the surface 103 of the stopper 38 comes into contact with the pin 27 of the cushion 26. In this case, the pin 27 moves to the right relatively slowly due to the viscosity of the fluid within the cushion 26. Therefore, the rotational velocity of the stopper 38 slows down. Finally, the stopper 38 stops its movement when the surface 102 abuts against the bolt 35b. Similarly, when the shaft 23' is rotated in the counterclockwise direction in FIG. 3A, the surface 104 of the stopper 38 comes into contact with the pin 27. After that, the stopper 38 stops its movement when the surface 101 abuts against the bolt 35a. In this case, the stopper 38 corresponds to a stopper 38' indicated by dotted lines in FIG. 3A. Thus, the rotational range of the stopper 38, i.e., the rotational range of the hand 25 (FIG. 2), is set at 90 degrees.

Figure 3B:
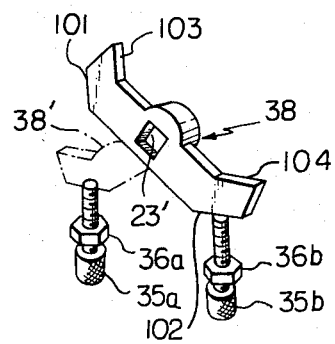
FIG. 3B is a partial perspective view of FIG. 3A.

FIG. 3B is a partial perspective view of FIG. 3A. As shown in FIG. 3B, the surfaces 101, 102, 103 and 104 of the stopper 38, and the bolts 36a and 36b are positioned in a plane perpendicular to the shaft 23' of the rotary actuator 23 (FIG. 2).

Figure 4A:
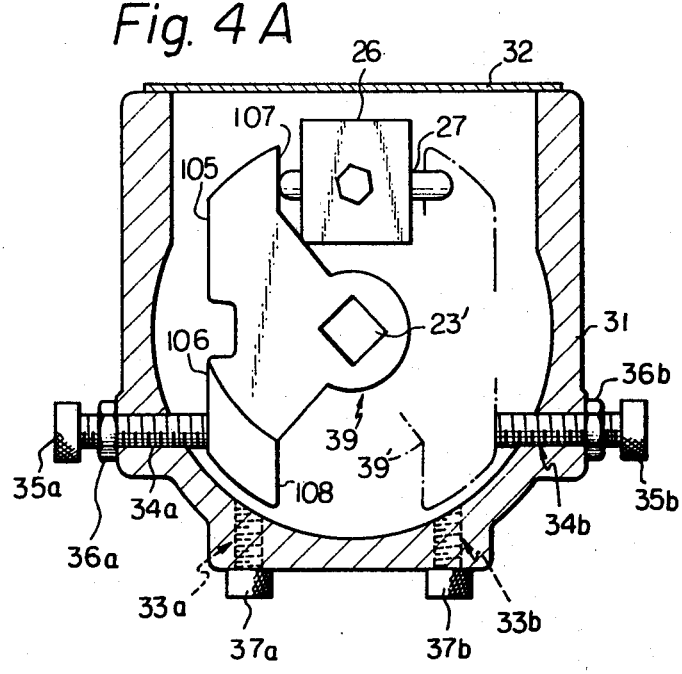
FIG. 4A is another detailed cross-sectional view of the supporting case 22, illustrated in FIG. 2, used for setting the rotational range of the hand at 180 degrees.

FIG. 4A is another detailed cross-sectional view of the supporting case 22, illustrated in FIG. 2, used for setting the rotational range of the hand at 180 degrees. In FIG. 4A, the stopper 38 (FIG. 3A) is replaced by a stopper 39. In addition, the bolts 35a and 35b are transferred from the threaded holes 33a and 33b to the threaded holes 34a and 34b, respectively, while the bolts 37a and 37b are transferred from the threaded holes 34a and 34b to the threaded holes 33a and 33b, respectively. The stopper 39 has four surfaces 105, 106, 107 and 108 which are parallel to each other. The stopper 39 operates in the same way as the stopper 38 (FIG. 3A), as described above. For example, when the shaft 23' of the rotary actuator 23 (FIG. 2) is rotated in the clockwise direction in FIG. 4A, the surface 107 comes into contact with the pin 27 of the cushion 26, so that the rotational velocity of the stopper 39 slows down. After that, the stopper 39 stops its movement when the surface 106 abuts against the bolt 35a. Similarly, when the shaft 23' is rotated in the counterclockwise direction in FIG. 4A, the surface 108 comes into contact with the pin 27 of the cushion 26. After that, the stopper 39 stops its movement when the surface 105 abuts against the bolt 35b. In this case, the stopper 39 corresponds to a stopper 39' indicated by dotted lines in FIG. 4A. Thus, the rotational range of the stopper 39, i.e., the rotational range of the hand 25 (FIG. 2) is set at 180° degrees.

Figure 4B:
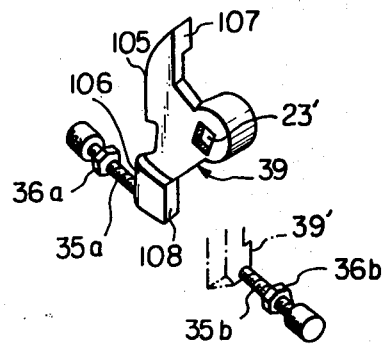
FIG. 4B is a partial perspective view of FIG. 4A.

FIG. 4B is a partial perspective view of FIG. 4A. As shown in FIG. 4B, the positions of the surfaces 106, 108 and the bolt 35a are different from those of the surfaces 105, 107 and the bolt 35b. As a result, the surfaces 106 and 108 never abut against the bolt 35b, while the surfaces 105 and 107 never abut against the bolt 35a.

As mentioned above, the rotational range of 90 or 180 degrees of the hand 25 (FIG. 2) can be selected easily by mounting the stopper 38 (FIG. 3A) or the stopper 39 (FIG. 4A), respectively, on the shaft 23' of the rotary actuator 23 (FIG. 2) and by exchanging the pair of bolts 35a and 35b with the pair of bolts 37a and 37b, respectively. However, it should be noted that the rotational ranges of the hand 25 are arbitarily adjustable by changing the shape of the stoppers or by changing the positions of the threaded holes 33a, 33b, 34a and 34b.

As explained hereinbefore, the automated device according to the present invention has the following advantages as compared with those of the prior art.

(1) The automated device is simple in construction, because no cylinders, gears, etc., are contained in the automated device for setting the rotational range of the hand.

(2) The changing of the rotational range of the hand s very easy, because it canm be carried out only by replacing the stopper and by changing the positions of the bolts.

(3) The total cost of the automated device is relatively low because of its simple construction.

What is claimed is:

1. An automated device comprising: an arm; a supporting case mounted on the end of said arm; a rotary actuator mounted on the end of said supporting case; a wrist rotatably held by said rotary actuator; a hand fixed to said wrist; a replaceable stopper means operatively coupled to said rotary actuator and disposed within said supporting case, wherein said stopper means rotates with said rotary actuator and said static means are positioned for contacting said stopper means at predetermined positions during the rotation thereof thereby preventing further rotation thereof; and a cushion means positioned within said supporting case for contacting said stopper means prior to the contact of said stopper means and said static means, wherein said cushion means thereby slows down the velocity of rotation of said rotary actuator and said static means stops the rotation of said rotary actuator at said predetermined positions independent of the rotational force applied thereto, and wherein said stopper means has four surfaces, one of said surfaces abutting against one side of said cushion means when a second one of said surfaces abuts against one of said static means, a third one of said surfaces abutting against the other side of said cushion means when a fourth one of said surfaces abuts against the other of said static means; whereby said rotary actuator can stop rotating at two predetermined positions.

2. An automated device as set forth in claim 1, wherein said stopper means has two surfaces at different angles with respect to the axis of said rotary actuator, each of said two surfaces being capable of abutting against one of said static means.

3. An automated device as set forth in claim 1, wherein said supporting case has at least a pair of holes into which said static means may be inserted.

4. An automated device as set forth in claim 3, wherein said static means are bolts, and said holes are threaded holes which are suitable for threading said bolts therein.

5. An automated device as set forth in claim 1, wherein said first and fourth surfaces, which are parallel to each other, are perpendicular to said second and third surfaces, which are parallel to each other, and said supporting case has a pair of holes on the side of the base thereof with said static means in said holes, whereby said rotary actuator can stop rotating at two positions which are 90 degrees apart with respect to the axis thereof.

6. An automated device as set forth in claim 1, wherein all of said four surfaces are parallel to each other, and the positions of said first and fourth surfaces are shifted from those of said second and third surfaces along the longitudinal axis of said supporting case, said supporting case having a pair of holes in the lower sides thereof with said static means in said holes, whereby said rotary actuator can stop rotating at two positions which are 180 degrees apart with respect to the axis thereof.

7. An automated device as set forth in claim 5 or 6, wherein said static means are bolts, and said holes are threaded holes which are suitable for threading said bolts therein.

* * * * *